United States Patent [19]

Broderick

[11] Patent Number: 5,073,583

[45] Date of Patent: Dec. 17, 1991

[54] ORGANOSILOXANE ELASTOMERS EXHIBITING IMPROVED PHYSICAL PROPERTIES

[75] Inventor: Dennis W. Broderick, Rhodes, Mich.

[73] Assignee: Dow Corning Corporation, Midland, Mich.

[21] Appl. No.: 419,553

[22] Filed: Oct. 10, 1989

Related U.S. Application Data

[63] Continuation-in-part of Ser. No. 202,639, Jun. 6, 1988.

[51] Int. Cl.$^5$ ............................................. C08K 5/3472
[52] U.S. Cl. ..................................... 524/91; 524/720; 528/21; 528/24
[58] Field of Search ....................... 524/91; 528/21, 24

[56] References Cited

U.S. PATENT DOCUMENTS

| | | | |
|---|---|---|---|
| 3,192,181 | 6/1965 | Moore | 260/46.5 |
| 3,272,891 | 9/1966 | Millionis et al. | 260/895 |
| 4,087,399 | 5/1978 | Hamada et al. | 260/37 SB |
| 4,156,674 | 5/1979 | Sumimura | 260/37 SB |
| 4,299,746 | 11/1981 | Frye | 260/29.2 M |
| 4,320,044 | 2/1982 | Nakamura | 524/413 |
| 4,373,060 | 2/1983 | Ching | 524/767 |
| 4,497,861 | 2/1985 | Kistner | 428/201 |
| 4,546,148 | 11/1985 | Cantatore | 525/186 |
| 4,670,490 | 6/1987 | Yoshida et al. | 524/186 |
| 4,935,455 | 6/1990 | Huy et al. | 522/99 |

FOREIGN PATENT DOCUMENTS 58-047058 3/1983 Japan.
61-275351 12/1986 Japan.

*Primary Examiner*—Melvyn I. Marquis
*Assistant Examiner*—R. Dean, Sr.
*Attorney, Agent, or Firm*—Robert Spector

[57] ABSTRACT

A group of substituted benzotriazoles unexpectedly improves the physical properties, particularly the tensile strength and tear strength, of peroxide cured organosiloxne elastomers.

5 Claims, No Drawings

ORGANOSILOXANE ELASTOMERS EXHIBITING IMPROVED PHYSICAL PROPERTIES

REFERENCE TO COPENDING APPLICATIONS

This application is a continuation-in-part of copending application Ser. No. 202,639, filed June 6, 1988.

BACKGROUND OF THE INVENTION

1. Field of the Invention

This invention relates to organosiloxane elastomer compositions. More particularly, this invention relates to additives for organosiloxane elastomers that impart a considerable improvement in tensile strength and tear strength.

2. Description of the Prior Art

The use of triazoles, i.e. heterocyclic organic compounds wherein the three heteroatoms are nitrogen, to impart various desirable properties to cured organosiloxane elastomers is taught in the prior art. U.S. Pat. No. 3,192,181, which issued to Moore on June 29, 1965 discloses using benzotriazoles as catalyst inhibitors for organosiloxane compositions that cure by a platinum-catalyzed hydrosilation reaction. Unsubstituted benzotriazole, which exhibits the formula

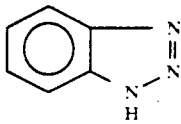

is the only inhibitor disclosed.

U.S. Pat. No. 4,087,399, which issued to Hamada et al. on May 2, 1978 teaches flame retarding agents for peroxide curable organosiloxane elastomer compositions. The flame retarding agents comprise a 1,2,3-triazole, 1,2,4-triazole or benzotriazole in combination with platinum or a platinum compound. The benzotriazoles can contain methyl radicals, unsubstituted phenyl radicals, or hydroxyl groups as substituents on the benzotriazole ring structure. The use of these flame retardants in room temperature vulcanizable organosiloxane compositions is taught in U.S. Pat. No. 4,156,674, which issued to Sumimura on May 29, 1979. Benzotriazoles containing a nitrogen-bonded phenyl radical with one or more tertiary alkyl radicals as substituents are not disclosed in either of these patents.

Benzotriazoles, together with benzophenones and other classes of organic compounds, absorb ultraviolet (UV) radiation.

SUMMARY OF THE INVENTION

The present inventor has now found that a group of substituted benzotriazoles known to be effective UV absorbers for organic polymers unexpectedly improve the physical properties, particularly the tensile strength and tear strength, of certain peroxide cured organosiloxane elastomers.

DETAILED DESCRIPTION OF THE INVENTION

This invention provides a curable organosiloxane composition conveertable to an elastomer exhibiting improved tensile strength and tear strength, said curable composition comprising a polydiorganosiloxane, an amount of an organic peroxide sufficient to cure said composition, and a substituted benzotriazole corresponding to the general formula

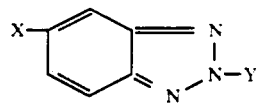

in an amount sufficient to improve the tensile and tear strengths of said elastomer, where X is a halogen atom and Y represents a substituted phenyl radical of the formula

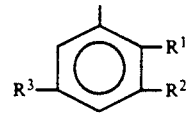

where $R^1$ represents hydroxyl or hydroxyalkyl containing from 1 to 4 carbon atoms, $R^2$ represents a tertiary alkyl radical containing from 4 to 6 carbon atoms and $R^3$ is selected from the group consisting of $R^2$ and a hydrogen atom.

This invention also provides a peroxide curable organosiloxane composition comprising A. a peroxide-curable polydiorganosiloxane where the organic groups bonded to silicon are selected from the group consisting of monovalent hydrocarbon and halohydrocarbon radicals;

B. an amount of an organic peroxide sufficient to promote curing of said composition at temperatures at least equal to the decomposition temperature of said peroxide; and C. a substituted benzotriazole of the foregoing general formula in an amount sufficient to improve the tensile strength and tear strength of the cured elastomer.

The polydiorganosiloxane ingredient of the present compositions is characterized by the general formula $A(R_2SiO)_xSiR_2A$, where each R individually represents a monovalent hydrocarbon or halogenated hydrocarbon radical that can contain from one to ten or more carbon atoms. A is a hydroxyl group or is selected from the same group as R and the value of x is from about 1000 to 10,000 or higher, depending upon the desired viscosity of the polydiorganosiloxane and the identity of the radicals represented by R. The viscosity of the polydiorganosiloxane can range from about 1000 Pa.s up to and including non-flowing gums.

The silicon-bonded hydrocarbon radicals of the polydiorganosiloxane are represented by R and contain from 1 to 10 or more carbon atoms. R can represent an alkyl radical such as methyl, ethyl, butyl or octyl; an alkenyl radical such as vinyl or allyl; a cycloaliphatic radical such as cyclopentyl or cyclohexyl; an aromatic radical such as phenyl, tolyl or naphthyl; or an aralkyl radical such as benzyl.

The hydrocarbon radicals represented by R can contain one or more halogen atoms as substituents. Typical substituted hydrocarbon radicals include but are not limited to chloromethyl, dichloromethyl, bromominated phenyl radicals and fluorinated alkyl radicals such as 3,3,3-trifluoropropyl.

The radicals represented by R are preferably methyl, vinyl, phenyl or 3,3,3-trifluoropropyl, this preference being based on the commercial availability of these polydiorganosiloxanes. Most preferably at least 50 percent of these hydrocarbon radicals are methyl. The presence of hydrocarbon radicals other than methyl provides certain desirable properties to the cued elastomer such as resistance to hydrocarbon solvents and the ability to retain physical properties at low temperatures.

The identity of the terminal units represented by A is dependent upon the starting reactants used to prepare the polydiorganosiloxane, specifically whether or not the reaction mixture used to prepare the polydiorganosiloxane contains a monofunctional silane or a hydrolyzable precursor of such a silane as a chain terminating agent. The units represented by A are typically hydroxyl or R, where R is as defined hereinabove.

Methods and reactants for preparing polydiorganosiloxanes suitable for use in the present curable compositions are sufficiently well known that a detailed discussion of these methods and reactants in this specification is not required.

A single polydiorganosiloxane or mixtures containing two or more of these polymers may be used to obtain the desired range of physical properties in the cured silicone rubber.

The curable compositions of this invention optionally contain a reinforcing filler to improve the physical strength of the compositions both during processing and following curing. A preferred class of reinforcing fillers are silicas having a surface area of from 50 to greater than 400 m$^2$/g. These fillers are known in the art and are commercially available. The amount of reinforcing filler can vary from 10 to as much as 100 weight percent, typically from 15 to 75 weight percent, based on the weight of polydiorganosiloxane.

Reinforcing silica fillers are typically treated with an anti-crepe hardening agent to prevent or inhibit an interaction between the polydiorganosiloxane and the filler that may increase the viscosity of the curable composition to the extent that it becomes unprocessable. Treatment of the filler can occur before the filler is combined with the other ingredients of the curable composition. Alternatively, the filler can be treated in-situ during preparation of the curable composition.

The anti-crepe hardening agent is typically a hydroxylsubstituted organosilicon compound such as a silane, organosiloxane, or a compound such as hexamethyldisilazane that reacts to yield a hydroxl-substituted organosilicon compound in the presence of water.

The curable composition may contain an extending filler to increase the bulk of the composition. This helps to lower the cost of the finished part as the extending fillers are much lower in cost than the silicone rubber base. When a base is extended with an extending filler such as ground quartz, the tensile strength of the cured organosiloxane elastomer is lower than that of the initial base. The amount of tensile strength lost is dependent upon the relative amounts of base and extending filler used as well as the exact nature of both ingredients. A portion of this lost tensile strength can be restored by postcuring the vulcanized elastomer in an oven.

The siliceous extending fillers used with present bases are finely ground particles of heat stable inorganic materials with an average particle size of under 25 micrometers. The finest extending fillers approach a particle size and configuration such that they have a surface area of as high as 50 m$^2$/g. Examples of siliceous extending fillers useful in this invention include ground quartz, diatomaceous earth, and glass.

About 25 weight percent of extending filler based on the weight of curable composition is necessary to significantly lower the cost of the composition. As much as 300 weight percent of some extending fillers may be used where the lowest cost is necessary. A preferred level of extending filler is from 25 to 200 weight percent, based on the curable composition. The preferred siliceous extending fillers are ground quartz and diatomaceous earth, with the most preferred filler being ground quartz with an average particle size of about 5 micrometers.

In those instances when it is desired to produce an optically transparent cured elastomer, siliceous extending fillers are omitted from the curable composition. This is particularly true if the cured elastomer is to be used as a sight enhancing device such as a contact lens or an intraocular lens. Certain of the present compositions wherein the polydiorganosiloxane contains silicon-bonded phenyl radicals are particularly suitable for this use.

In addition to the present substituted benzotriazoles the curable organosiloxane composition may also contain minor amounts of additives to improve the heat stability, handling, compression set, oil resistance, flame retardancy or other properties of the cured elastomer.

The curable compositions of this invention contain an organic peroxide that will cure the polydiorganosiloxane ingredient. If the polydiorganosiloxane does not contain any vinyl radicals, it must be cured with organic peroxides that are efficient in causing curing of such polydiorganosiloxanes. Organic peroxides of this type are referred to as "non-vinyl specific" and are represented by such organic peroxides as benzoyl peroxide, dicumyl peroxide, and 2,4-dichlorobenzoyl peroxide.

If the polydiorganosiloxane contains vinyl radicals, it can be cured with either "non-vinyl specific" or "vinyl specific" organic peroxides. Representative of the vinyl specific organic peroxides are di-t-butylperoxide and 2,5-bis-(t-butylperoxy)-2,5-dimethylhexane. All these organic peroxides and their properties are well known in the art. The properties of the cured silicone rubber can be altered by the type and amount of peroxide used to cure the composition. Typical changes due to such choices are well recognized in the art. The organic peroxide is present in amounts of from 0.1 to 5 weight percent, based on the weight of the curable composition, preferably from 0.5 to 2.0 weight percent.

The critical ingredient responsible for the unique improvement in the physical properties of cured elastomers prepared from the organosiloxane compositions of this invention is a benzotriazole of the general formula

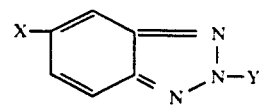

where X is a halogen atom and Y represents a substituted phenyl radical of the formula

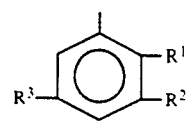

where R$^1$ represents hydroxyl or hydroxyalkyl containing from 1 to 4 carbon atoms, R$^2$ represents a tertiary alkyl radical containing from 4 to 6 carbon atoms and $R^3$ represents a tertiary alkyl radical containing from 4 to 6 carbon atoms or a hydrogen atom.

Preferred benzotriazoles are those wherein X is chlorine, $R^1$ represents hydroxyl or hydroxymethyl, $R^2$ represents a tertiary butyl or a tertiary amyl radical and $R^3$ represents the same tertiary alkyl radical as $R^2$ or a hydrogen atom, this preference being based on the availability of these substituted benzotriazoles and the physical properties of cured organosiloxane elastomers containing these compounds as additives.

The present inventor observed that the physical properties, particularly tensile strength and tear strength, achieved using the preferred group of benzotriazoles appears to reach a maximum at a concentration level of between 4 and 6 percent, based on the weight of the curable composition. Above a concentration of about 5 percent these properties begin to decrease. As little as 0.1 weight percent of a substituted benzotriazole of this invention is believed to impart a useful improvement in tensile and tear strength to the cured elastomer.

The most preferred level of benzotriazole is dependent upon the types and amounts of the other ingredients in the curable organosiloxane composition. This most preferred level can be readily determined by simple and routine experimentation, and is typically from about 4 to about 6 weight percent.

The peroxide curable organosiloxane compositions of this invention are prepared by any suitable means that will produce a homogeneous mixture of the various ingredients. Methods of mixing that are common in the silicone rubber art and which are suitable for this invention include mixing with a dough mixer, a rubber compounding mill, or with a Banbury mixer.

The order in which the various ingredients are added during preparation of the curable composition is not critical, although the organic peroxide is typically added last to prevent premature curing of the composition.

In accordance with a typical preparation, a blend of the polydiorganosiloxane together with any reinforcing fillers and anti-creping agents is prepared, at which time the benzotriazole together with any extending fillers and other property modifiers such as processing aids, stabilizers, flame retardants, anti-oxidants and pigments are added to the mixer and blended to homogeniety. The final ingredient added and blended into the composition is typically the organic peroxide.

The curable homogeneous compositions of this invention can be cured by any suitable means that will cause decomposition of the organic peroxide. Heating is the preferred method. The time and temperature necessary to effect curing are dependent upon the particular organic peroxide selected, the method of heating, the method of shaping the curable composition to the desired configuration, and the thickness of the cured article. The temperature that is appropriate for a given set of conditions is well known in the silicone rubber art. Typical temperatures are from 110° C. to 175° C. for molding operations to as high as 300° C. for the ovens used in continuous hot air vulcanization operations.

Prior to or during curing the composition is shaped to the desired configuration using any of the well known methods of forming elastomeric compositions, including press molding, injection molding, calendering, and the extrusion of both supported and unsupported articles. If post-curing is required it is typically of from 1 to 24 hours in duration at a temperature of from 150° C. to 250° C.

The compositions of this invention can be fabricated into elastomeric articles suitable for any of the uses known for silicone elastomers. These articles include molded parts for high temperature applications, gaskets, O-rings, diaphragms, tubing, and insulation for electrical wiring.

Curable compositions wherein the polydiorganosiloxane contains at least about 2 mole percent of phenyl-substituted diorganosiloxane units are transparent and particularly suitable for fabrication into contact lenses and intraocular lenses to correct impaired vision.

The following examples are included for illustrative purposes only and should not be construed as limiting the invention which is properly delineated by the accompanying claims. All parts and percentages are by weight unless otherwise indicated.

EXAMPLE 1

This example demonstrates the improvement in tensile and tear strengths achieved by the addition of a substituted benzotriazole of this invention to a peroxide-curable organosiloxane composition.

A peroxide-curable composition was prepared by blending the following ingredients to homogeniety 100 parts of a dimethylvinylsiloxy-terminated polydiorganosiloxane gum exhibiting a Williams Plasticity Number of about 152 and containing 99.8 mole percent of dimethylsiloxane units and 0.2 mole percent of methylvinylsiloxane units;

7.5 parts of a hydroxyl endblocked polydimethylsiloxane fluid having a viscosity of about 0.04 Pa.s at 25 degrees C. and containing about 4 weight percent of silicon-bonded hydroxyl groups; and 23 parts of a fume silica having an nominal surface area of 250 m²/g.

The resultant composition was blended to homogeniety with 0.5 weight percent of 2,5-bis(t-butylperoxy)-2,3-dimethylhexane and 2 or 4 weight percent of 2-(2'-hydroxymethyl-3'-t-butylphenyl)-5-chlorobenzotriazole. A composition without any benzotriazole was used as a control.

The resultant mixtures were molded into test bars in accordance with ASTM test procedure D 412 for measuring the tensile properties of elastomeric materials and procedure D 624 for measuring the Die B tear strength of elastomeric materials. While in the molds the test samples were heated for 15 minutes at a temperature of 175 degrees C., and the samples were post-cured for four hours at a temperature of 225 degrees C.

The tensile strength, tear strength and elongation of the molded bars were measured in accordance with the aforementioned ASTM procedures, and the results are recorded in the following Table I. Bars molded from a curable composition containing the identical types and amounts of ingredients with the exception of omitting the benzotriazole were evaluated for comparative purposes.

TABLE I

| Substituted Benzotriazole (%) | Tensile Strength (MPa) | Elongation (%) | Tear Strength (Kilonewtons/m) |
|---|---|---|---|
| 0 (control) | 8.4 | 642 | 8.575 |
| 2 | 10.9 | 1033 | 24.15 |

TABLE I-continued

| Substituted Benzotriazole (%) | Tensile Strength (MPa) | Elongation (%) | Tear Strength (Kilonewtons/m) |
|---|---|---|---|
| 4 | 5.0* | 1291* | 30.1 |

*the test bars did not break when the jaws of the tensionometer were the maximum distance apart.

These data demonstrate the unexpected increase in tensile strength and the increase by a factor of more than 3 in tear strength achieved by adding 4% by weight of the a substituted benzotriazole of this invention to a silica-filled peroxide-curable organosiloxane elastomer composition. The tensile strength of the cured elastomer containing 4 weight percent of the benzotriazole could not be measured because the sample did not break when the distance between the jaws of the tensionometer was the maximum obtainable.

EXAMPLE II

This example demonstrates the improvement in tensile strength, elongation and tear strength of the cured organosiloxane elastomer achieved by adding three different substituted benzotriazoles to an unfilled curable organosiloxane composition.

One of the benzotriazoles was 2-(2'-hydroxymethyl-3'-t-butylphenyl)-5-chlorobenzotriazole, referred to hereinafter as A, the same one used in Example 1. The other two substituted benzotriazoles were 2-(2'-hydroxy-3', 5'-di-t-butylphenyl)-5-chlorobenzotriazole, referred to hereinafter as B, and, as a comparative sample, 2-(2'-hydroxy-3', 5'-di-t-amylphenyl) benzotriazole, referred to hereinafter as C, which is outside the scope of this invention.

Peroxide-curable organosiloxane elastomer compositions of this invention were prepared by blending to homogeniety 100 parts of an organosiloxane copolymer and 1.5 parts of dicumyl peroxide. The copolymer contained containing 91.4 mole percent of dimethylsiloxane units, 6.7 mole percent of diphenylsiloxane units, 1.0 mole percent of methylvinylsiloxane units and 0.9 mole percent of dimethylvinylsiloxane terminal units. This mixture was blended to homogeniety with the types and amounts of substituted benzotriazoles specified in Table II, molded into test bars and evaluated as described hereinabove in example 1. A test bar prepared from a composition containing 100 parts of the same copolymer and 1.5 parts of dicumyl peroxide was prepared and evaluated for comparative purposes.

TABLE II

| Benzotriazole Type | % | Tensile Strength (MPa) | Elongation (%) | Tear Strength (Kilonewtons/m) |
|---|---|---|---|---|
| A | 2.0 | 9.5 | 395 | 13.5 |
| A | 4.0 | 10.9 | 684 | 22.05 |
| A | 6.0 | 6.7 | 715 | 18.4 |
| B | 2.5 | 8.2 | 329 | 9.8 |
| C* | 2.5 | 7.5 | 211 | 4.9 |
| Control | 0.0 | 4.7 | 128 | 3.7 |

*C was evaluated for comparative purposes

These data demonstrate that both of the substituted benzotriazoles evaluated increase the tensile strength and tear strength of the cured organosiloxane elastomer composition relative to the control. Benzotriazole A appears to be the most effective in this respect. The data also indicate that the ability of benzotriazole A to increase the tensile and tear strength of the cured elastomer reached a maximum at a concentration of between 4 and 6 percent by weight. Benzotriazole C provided only a 1.3 fold increase in tear strength, compared with the 2.6 fold increase for benzotriazole B and the 3.6 fold increase for benzotriazole A at a concentration of only 2.0%.

EXAMPLE III

This example demonstrates that the magnitude of improvement in tensile and tear strengths achieved using the substituted benzotriazoles of this invention cannot be achieved using unsubstituted benzotriazole. The curable organosiloxane composition described in example I was blended to homogeniety with 0.5 weight percent of 2,5-bis(t-butylperoxy)-2,3-dimethylhexane and either 1, 2, or 3 percent by weight of benzotriazole. A curable composition containing no benzotriazole was evaluated for comparative purposes. The compositions were then molded into cured test bars and evaluated as described in Example 1. The results are recorded in the following Table III.

TABLE III

| Benzotriazole wt % | Tensile Strength (MPa) | Elongation (%) | Tear Strength (Kilonewtons/m) |
|---|---|---|---|
| 0 | 9.32 | 643 | 10.3 |
| 1 | 8.21 | 703 | 11.9 |
| 2 | 8.63 | 662 | 11.6 |

The tear strength of the sample containing 2 percent by weight of benzotriazole was only 1.2 times the value for the sample containing no benzotriazole. By comparison, the data in Table I demonstrate a nearly 3-fold improvement in tear strength when one of the present substituted benzotriazoles was added to the same curable silicone rubber composition. These data demonstrate the uniqueness of the substituted benzotriazoles of this invention with respect to the ability of these compounds to substantially increase the tensile and tear strengths of peroxide cured organosiloxane elastomers.

That which is claimed is:

1. A peroxide-curable organosiloxane composition comprising
   A. a polydiorganosiloxane where the organic groups bonded to silicon are selected from the group consisting of monovalent hydrocarbon and halohydrocarbon radicals;
   B. an amount of an organic peroxide sufficient to promote curing of said composition at temperatures at least equal to the decomposition temperature of said peroxide; and
   C. a benzotriazole of the general formula

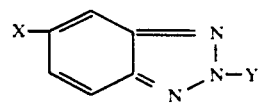

in an amount sufficient to improve the physical properties of the cured elastomer while simultaneously imparting a resistance to ultraviolet-induced degradation.

where X is a chlorine atom and Y represents a substituted phenyl radical of the formula

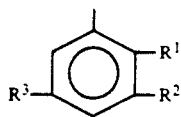

and where $R^1$ represents hydroxyl or hydroxyalkyl containing from 1 to 4 carbon atoms, $R^2$ represents a tertiary alkyl radical containing from 4 to 6 carbon atoms and $R^3$ is selected from the group consisting of $R^2$ and a hydrogen atom.

2. A composition according to claim 1 where said composition includes from 10 to 100 weight percent, based on the weight of said polydiorganosiloxane, of a reinforcing silica filler.

3. A composition according to claim 1 where said polydiorganosiloxane is represented by the formula $A(R_2SiO)_xSiR_2A$, where each R individually represents a monovalent hydrocarbon or halogenated hydrocarbon radical containing from one to ten or more carbon atoms, A is a hydroxyl group or is selected from the same group as R and the value of x is from 1000 to 10,000, the concentration of organic peroxide is from 0.1 to 5 weight percent, based on the weight of said curable composition, and the concentration of said benzotriazole is at least 0.1 weight percent, based on the weight of said composition.

4. A composition according to claim 3 where R is methyl, phenyl or 3,3,3-trifluoropropyl and the concentration of said benzotriazole is from 4 to 6 weight percent, based on the weight of said curable composition.

5. A composition according to claim 4 where at least 50 percent of the R radicals are methyl and any remaining R radicals are phenyl, $R^2$ and $R^3$ are both t-butyl or t-amyl, or $R^2$ is t-butyl and $R^3$ is hydrogen, $R^1$ and represents hydroxyl or hydroxymethyl.

* * * * *